INVENTOR
KURT M. TRAMPEL
BY John F. Ostendorf
ATTORNEY

United States Patent Office 3,183,370
Patented May 11, 1965

3,183,370
TRANSISTOR LOGIC CIRCUITS OPERABLE THROUGH FEEDBACK CIRCUITRY IN NONSATURATING MANNER

Kurt M. Trampel, Poughkeepsie, N.Y., assignor to International Business Machines Corporation, New York, N.Y., a corporation of New York
Filed Dec. 7, 1961, Ser. No. 157,742
7 Claims. (Cl. 307—88.5)

This invention relates to logic circuits and more particularly to transistor switching circuits operable in non-saturating manner.

In the development of present-day digital computers, efforts are being concentrated on obtaining greater machine versatility at less expense. Since computer versatility is controlled to a large extent by the speed capabilities of a machine's circuits, developmental endeavors are being directed at obtaining increased circuit operating speeds.

It is well known in the art that the speed capabilities of logic performing transistor switching circuits are inherently limited when the transistors are operated in a saturated manner, (i.e., during the "ON" condition of a transistor, the collector-base junction is permitted to become forward biased so that minority carriers accumulate in the base region). The resultant effect of saturated operation is a storage time delay before these carriers can be extracted from the transistor enabling it to be switched to an "OFF" condition.

Consequently, numerous techniques have been devised for preventing circuit operation of transistors in a saturated mode, thereby enhancing the operating speed of the circuit. These techniques include the clamping of the collector electrode of a transistor to a supply voltage through a diode so that the collector voltage is prevented from falling below the base voltage to forward bias the collector junction into the saturation region. Another technique entails the use of unidirectional conducting devices connected in arrangements for controlling the base current to the transistor so as to limit the collector current to a level slightly below the saturation region. A third technique requires the use of optimized transistors which are insensitive to the minority carriers that are injected into it.

All of these techniques have limitations. For example, when the first technique is employed, the response time of the transistor is not increased, since it depends on the recovery time of the diode. Since the collector current of the transistor is not clamped and, therefore, may increase by a factor of as much as ten to one, the recovery time may be extensive before the diode turns off to permit an increase in collector voltage to turn off the transistor. If the second technique is utilized, the circuit is dependent upon the input signal and, therefore, when it is sufficiently overdriven, the unidirectional conducting devices saturate to the point where they can no longer retain the transistor outside the saturation region. The third technique of preventing saturation of the transistor renders the control of the saturation of a transistor independent of the input signal, but requires the use of special, selected transistors having particular characteristics. These transistors are expensive and not readily obtainable.

Accordingly, it is a primary object of the invention to provide switching circuits operable in high speed manner for performing logical operations.

It is another object of the invention to provide switching circuits including transistors arranged to operate in non-saturating manner to perform logical operations at high speeds.

It is a further object of the invention to provide a feedback arrangement in a transistor switching circuit for preventing saturation of the transistor.

In accordance with an aspect of the invention, there is provided in one illustrative embodiment, a logic circuit operable at speeds in the nanosecond range to provide an output signal that is the Boolean complement of the input signal. The circuit comprises a transistor inverter connected in common emitter circuit configuration to receive an input signal at its base electrode. Emitter current of the inverter is supplied from a regulated current source which is regulated by the inverter output signal through a feedback circuit connected to the output electrode of the inverter. When the inverter is operating in an "OFF" condition, the feedback circuit and a biasing circuit condition the regulated current source to instantaneously respond to a change of level of the inverter input signal. Conduction takes place through the inverter to provide the complement of the input signal and also the feedback signal to regulate the amount of emitter current supplied to the inverter.

A feature of the invention is the use of two cascaded inverters, the second operating as a regulated current supply for the first and being, in turn, controlled by the output of the first.

Another feature of the invention is the provision of circuit arrangements including at least one set of two cascaded inverters having the first responsive to an input signal to regulate the second in supplying current to the first, so that logical functions may be performed by the arrangements in high speed manner by avoiding the time delays inherent in saturated transistor operation.

A further feature of the invention is to provide transistor switching circuits having output signal levels that are independent of the input signal levels.

The foregoing and other objects, features and advantages of the invention will be apparent from the following more particular description of preferred embodiments of the invention as illustrated in the accompanying drawing, wherein.

Figure 1:
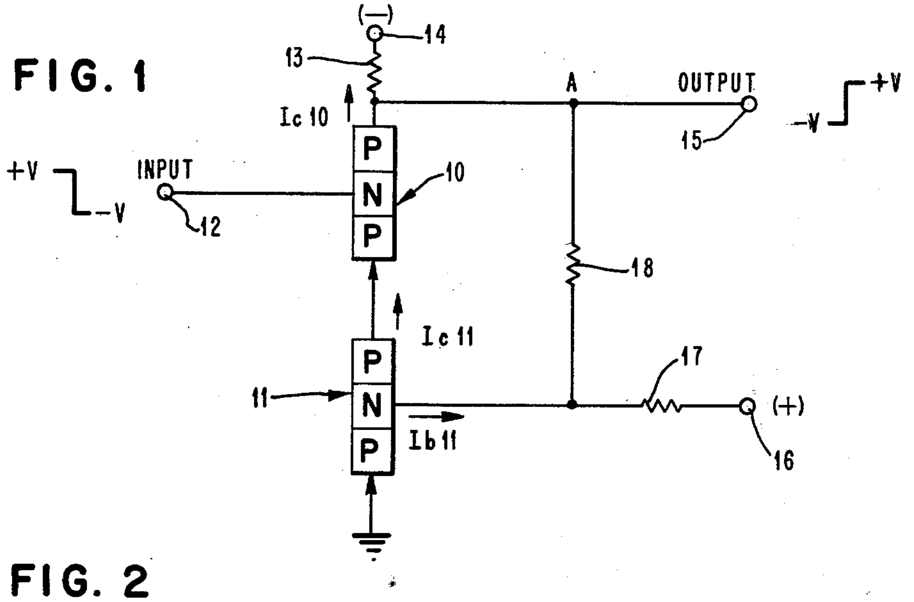
FIG. 1 is a circuit diagram of a non-saturating inverter circuit embodying the principles of the invention.

Referring now to FIG. 1, the inverter circuit of the invention comprises a pair of transistors 10 and 11 connected in cascade. Transistor 10 is adapted to receive at its base electrode, a variable input signal supplied to the terminal 12; the circuit output at terminal 15 being coupled to the collector electrode of this transistor. Biasing of the collector electrode of transistor 10 is accomplished through a resistor 13 by a voltage supply of negative polarity connected to the terminal 14.

The emitter electrode of the transistor 11 is connected to a reference potential, for example, ground, and the base electrode is biased from the voltage supplies connected to the terminals 14 and 16 through a voltage divider including the resistors 13, 17 and 18. In addition to forming a part of the voltage divider, resistor 18 also serves as a part of a feedback circuit to couple the collector electrode of the transistor 10 to the base electrode of the transistor 11.

As shown in FIG. 1, the transistors 10 and 11 are of the PNP type. It should be understood, however, that NPN type transistors may also be utilized if suitable polarity changes are made in the bias supplies.

In the initial condition of circuit operation, if it is assumed that the input signal is at an "UP" level, i.e. at +V, the transistor 10 is rendered non-conductive. The level of the output signal is "DOWN" at a —V level independent of the level of the input signal and determined by the voltage drop across the resistors 13 and 18.

Concurrently with this condition, the feedback circuit and the biasing arrangement for the base electrode of transistor 11 maintain the potential at this electrode clamped at a level slightly negative with respect to the ground potential at the emitter electrode. Thus, the base-emitter junction of transistor 11 is forward-biased enabling conduction of base current to take place at a maximum level. At the same time, the base-collector junction of transistor 11 is also forward-biased since the potential at the collector electrode is positive with respect to the potential at the base electrode at a level between the levels of the base electrode and that of the input signal. Thus, the collector current is at a minimum and the transistor 11 is conducting in a slightly saturated state. As such, it is prepared to conduct current to the transistor 10 as soon as the level of the input signal is changed to render the transistor 10 conductive.

As the operating mode of the circuit is changed by varying the level of the input signal to a more negative level, that is, —V, transistor 10 is switched to an "ON" condition and the collector-base junction of transistor 11 is reverse-biased enabling current to be supplied to the transistor 10. The base current of transistor 11 decreases and the collector current increases as the level of the input signal changes. This aspect of circuit operation will be apparent from the description that follows of the W and X curves of FIG. 2.

Concurrently with this change in circuit operation, the level of the output signal begins to rise and the voltage at the node A becomes more positive due to the voltage drop occurring across the resistor 13. The initial voltage at this node (during this aspect of circuit operation) is indicated at a point B as $Vc10'$ on the W curve of the operating characteristic of FIG. 2; the W curve depicting the characteristic of the voltage at node A with respect to the base current of the transistor 11. Since the voltage $Vc10$ at node A is initially at the level $Vc10'$ when the transistor 10 is switched to a conductive condition, a base current of $Ib11'$ is flowing. This base current permits a current $Ic11'$ (point C on the X curve) to flow from the collector electrode of transistor 11 to the transistor 10. Since this amount of current is permitted to flow to the transistor 10, a substantially equivalent collector current $Ic10'$ (point D on curve Y) flows from the transistor 10. As indicated at the point E on the characteristic curve Z for the transistor 10, operation of the transistor is taking place in a slightly conductive state; the point E being determined by the equivalent resistance of the resistors 13 and 18.

Figure 2:
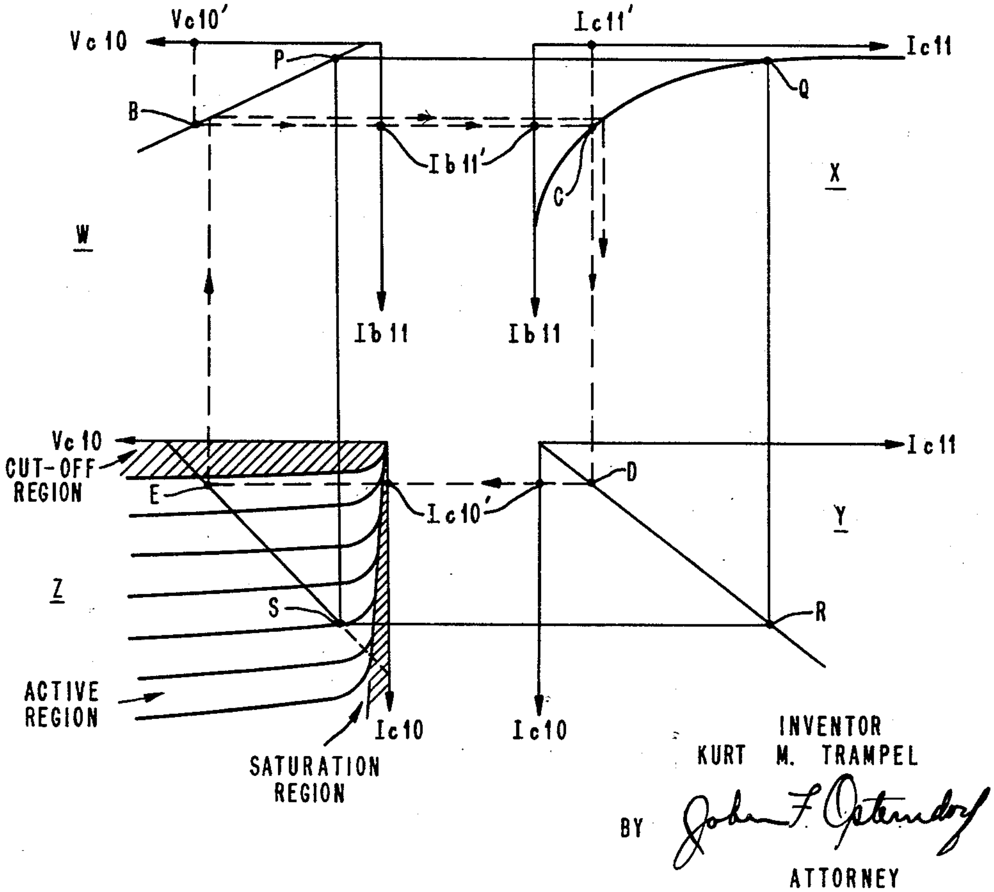
FIG. 2 is a composite operating characteristic curve for one of the operating conditions of the circuit of FIG. 1. The four curves, indicated as W, X, Y, Z, when taken individually represent the characteristic curves of certain of the parameters of the circuit components.

With respect to the X curve of FIG. 2, which depicts the current characteristics for the collector-base diode of the transistor 11, it is readily apparent that this is not a conventional diode characteristic. Rather, the configuration of the curve is due solely to the circuit arrangement including the feedback connection which causes the base current of the transistor 10 to be inversely proportional to the collector current.

As the voltage at the node A continues to increase to a more positive level, in response to a change in the conductive level of the transistor 10, the circuit seeks a stable or quiescent operating condition. For example, if the dash lines of FIG. 2 are followed from the point indicated at B on the W curve in the direction of the arrows, it will be readily apparent that the circuit will gradually arrive at a stable operating condition. This condition is indicated by the solid line connecting the four independent curves W, X, Y and Z at the points, P, Q, R and S. This condition is the only stable or quiescent condition of operation for the circuit during the "ON" condition of the transistor 10. When this condition is achieved, the level of the input signal is at —V and the level of the output signal is at +V.

Referring again to the Z curve of FIG. 2, it is obvious that the point indicated at S is out of the saturation region of operation of the transistor 10. The circuit cannot enter into the saturation region of operation at any time since the effect of the feedback circuit is to couple the output signal to the input of transistor 11 raising the voltage at the base electrode of the transistor 11. Its base current is limited controlling, in turn, the amount of collector current that can be supplied by the transistor 11 to the transistor 10. The levels of the output signal are also stabilized and are made independent of the levels of the input signal depending on the current which is supplied by the collector electrode of transistor 11 to the emitter electrode of transistor 10.

As an additional feature of the invention, it may be noted that the circuit accuracy may be enhanced if the levels of the input signal are controlled. It will be readily apparent to one skilled in the art that this may be accomplished in a number of ways. By way of illustration, however, it may be stated that one way of performing this is to clamp the input signal to a particular level by employing a network including a resistive element and a silicon diode.

Figure 3:
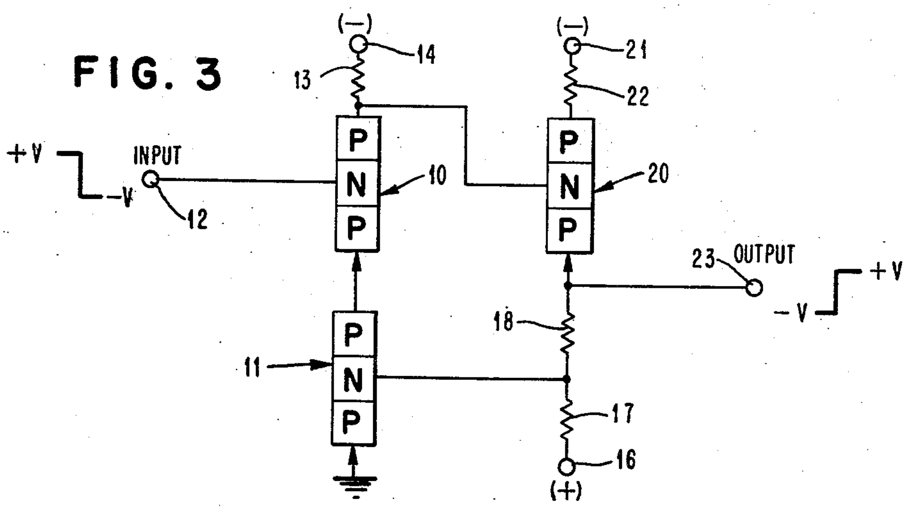
FIG. 3 is a circuit diagram of a modified form of the invention.

Referring now to FIG. 3, the circuit of FIG. 1 may also be arranged to provide additional power driver by incorporating a third transistor connected as an emitter follower in the feedback circuit between the output of the transistor 10 and the input at the base electrode of the transistor 11. This additional transistor 20, which receives the output signal of the transistor 10 at its base electrode, is biased at its collector electrode through a resistor 22 by a negative voltage supply connected to a terminal 21. The circuit output then may be obtained at the emitter electrode of this transistor at the terminal 23.

The operation of this circuit is similar to that of the circuit of FIG. 1. The feedback circuit including the transistor 20 and resistor 18 couples the output signal from transistor 10 to prevent saturation of the transistors 10 and 11 during the "ON" condition of the transistor 10. When the level of the input signal is at +V, the transistor 10 is non-conducting and the level of the base electrode of the transistor 20 is substantially that of the supply connected at terminal 14 less the voltage drop across the resistor 13. Since this level is less negative than the level of the voltage at the collector electrode (i.e. the voltage supply at terminal 21 is designed to be more negative than that at the terminal 14), the transistor 20 is rendered conductive to produce a negative output signal which is determined, in part, by the voltage supply connected to the terminal 16. In like manner, when the level of the input signal drops to a negative level of −V, the transistor 10 is rendered conductive, the transistor 20 is still conductive and the level of the output signal is determined by the voltage supplies coupled to the terminals 14 and 16 and the resistors 13, 17 and 18.

It is readily apparent that the arrangement of FIG. 1 can also perform other logical operations in addition to signal inversion by merely connecting additional transistors in parallel with the transistor 10. For example, as shown in FIGS. 4 and 5, the circuit can be modified to perform the NAND and NOR functions, respectively, by merely connecting the transistors 10*a* and 10*b* in parallel with the transistor 10 so that the emitter electrodes of all three transistors are connected in common to the collector electrode of the transistor 11.

Figures 4, 5:
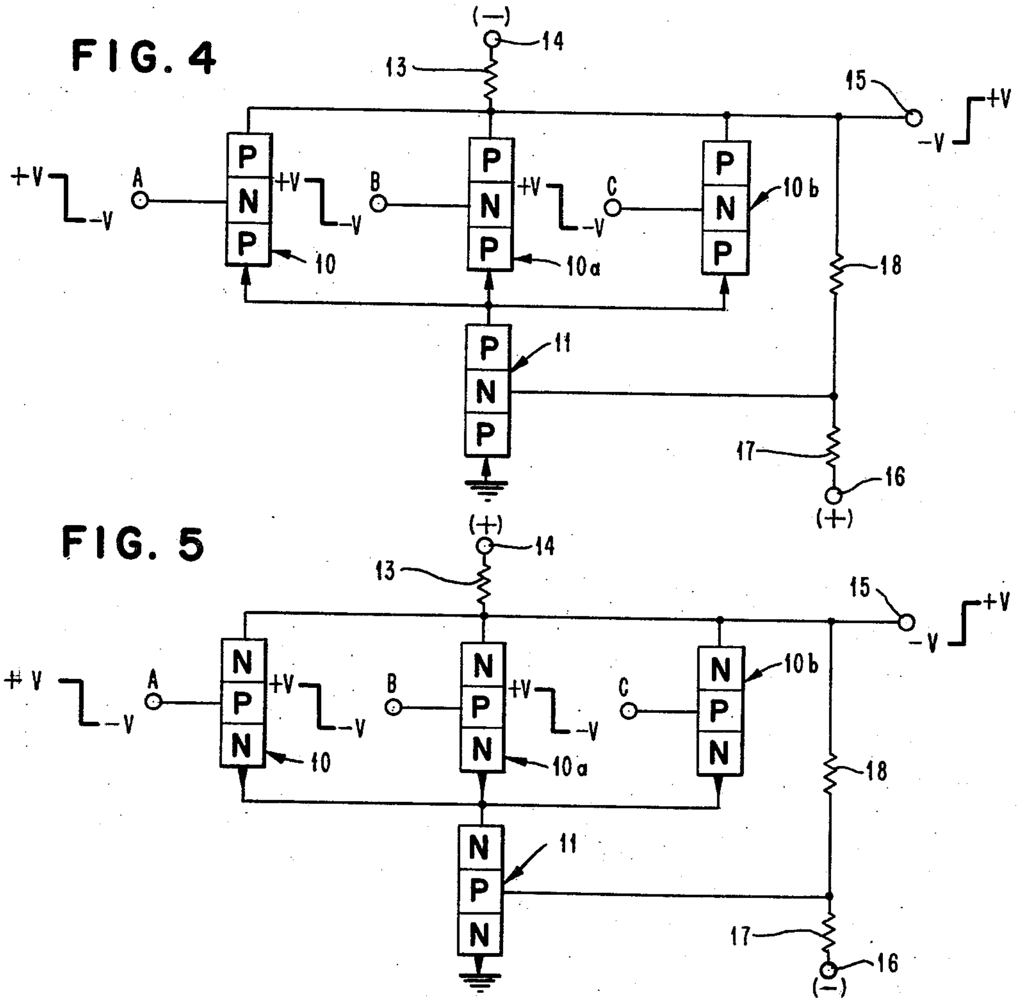
FIGS. 4 and 5 are circuit diagrams illustrating the manner in which the principles of the invention may be applied to perform NAND and NOR logical functions, respectively.

As shown in FIG. 4, the NAND operation is performed providing a negative output level if the levels of all of the input signals, A, B and C are at "UP" level, i.e. +V. If any one or more of the signals A, B or C drops to a "DOWN" level, the corresponding transistor 10, 10*a* or 10*b* is rendered conductive to provide an "UP" output level.

In similar manner, the NOR function is performed in FIG. 5 by employing the complementary types of transistors with suitable changes of polarity in the bias supplies. The level of the output signal is "UP" only if the levels of all of the input signals are "DOWN." Under any other input signal conditions, the level of the output signal is "DOWN."

It is obvious from the description of the circuit operation that logical operations can be performed by transistor switching circuits in high speed manner by preventing the transistors from operating in the saturation region. This is accomplished by employing a simple feedback network which brings about the control of current flow in the transistors of the circuit in a manner which does not depend in any respect on the input signal. It also does not require the use of other semiconductor devices which themselves are subject to the problems of saturation. In addition, the circuit does not depend on the use of special components, but rather may employ components whose tolerances are not critical.

While this invention has been particularly shown and described with reference to preferred embodiments thereof, it will be understood by those skilled in the art that the foregoing and other changes in form and details may be made therein without departing from the spirit and scope of the invention.

What is claimed is:

1. A transistor switching circuit operable in non-saturating manner in response to an input signal variable between first and second levels, comprising a regulated current supply, an output circuit, a transistor connected in common emitter circuit configuration with its emitter electrode coupled to said supply and its collector electrode to said output circuit enabling the base electrode of said transistor to respond to said input signal, so that when said signal is at the first level said transistor is in a cut-off condition providing a signal at a first level at said output circuit and when said signal is at the second level said transistor is in a conductive condition providing a signal at a second level at said output circuit, said second level being determined by the amount of current flowing from said supply to said emitter electrode, and a feedback circuit coupled between said output circuit and said supply for regulating the amount of current flowing from said supply to said emitter electrode, whereby said transistor is operable in non-saturating manner.

2. The circuit of claim 1, wherein said feedback circuit includes a second transistor connected in common collector configuration for providing power drive for said circuit, said output circuit being coupled to said second transistor.

3. A transistor switching circuit, comprising a first transistor having emitter, base and collector electrodes, a regulated current supply including a second transistor having emitter, base and collector electrodes and connected in common emitter circuit configuration with the collector electrode of said second transistor being coupled to the emitter electrode of said first transistor, and a feedback circuit coupling the collector electrode of said first transistor to the base electrode of said second transistor, the base electrode of the first transistor being responsive to an input signal variable between first and second levels so that when said input signal is at the first level said first transistor is biased in a cut-off condition enabling an output signal at a first level to be provided at its collector electrode, said out-put signal being coupled through said feedback circuit to maintain said second transistor in a conductive condition, and so that when said first transistor responds to said second level it is rendered conductive to provide an output signal at a second level at its collector electrode determined by the amount of current flow from said second transistor to the emitter electrode of said first transistor, said second output signal being coupled through said feedback circuit to said second transistor for regulating the amount of current flowing from said second transistor to said first transistor.

4. A switching circuit for inverting an input signal variable between first and second levels, comprising a current supply including a transistor having emitter, base and collector connected in common emitter circuit configuration, a variable load impedance connected in the collector circuit of said transistor and having said input signal directly applied thereto, an output circuit connected to the load impedance, said input signal varying the current requirements of said load impedance when varied between said first and second levels to provide a controlled current in the output circuit regulated by the current supplied by said transistor to said load impedance, and a feedback circuit coupling the output circuit with the base circuit of said transistor for regulating the amount of current supplied by said transistor to said load impedance so that the inversion of said input signal is accomplished in non-saturating manner.

5. The circuit of claim 4, wherein said feedback circuit includes a second transistor connected in common collector configuration for providing power drive for said circuit, said output circuit being coupled to the output of said second transistor.

6. A transistor switching circuit for producing an inverted output signal in response to an input signal variable between first and second levels, comprising first and second transistors connected in cascade with the collector of the second transistor connected to the emitter of the first transistor, so that the first transistor responds to the input signal and the second transistor acts as a regulated current supply for the first transistor, a feedback circuit for regulating the amount of current supplied by said second transistor in response to the output level of the first transistor, said first transistor being rendered non-conductive in response to the first level input signal so that the feedback circuit maintains the second transistor conductive with a maximum base current and minimum collector current, said first transistor being rendered conductive in response to a change of input signal toward the second level to vary the level of the output signal, whereby the base current of said second transistor decreases and the collector current increases until the first transistor is operating at a stable non-saturating operating condition producing an output signal at a second level, said first transistor being prevented from entering a saturated state of operation by the limitation of the flow of current from the second transistor in response to the output of said first transistor.

7. A transistor switching circuit, comprising a regulated current source including a transistor having emitter, base and collector electrodes and connected in common emitter circuit configuration, a plurality of signal translating devices connected in common in the collector circuit of said transistor, each of said devices being directly responsive to an input signal variable between first and second levels, an output circuit coupled to each of said devices, and a feedback circuit coupling the output circuit to the base electrode of said transistor for regulating the flow of current from said transistor so that when all of said signals are at a first level, each of said devices is maintained in a non-conductive condition and said circuit provides an output signal at a first level and said transistor is maintained in a conductive condition, and when any of said devices has its input signal varied from said first to said second level, said output circuit provides an output signal at a second level determined by the amount of current supplied by said transistor under the regulation of said feedback circuit.

References Cited by the Examiner

UNITED STATES PATENTS

| | | | |
|---|---|---|---|
| 2,935,626 | 5/60 | MacSorley | 307—88.5 |
| 3,021,432 | 2/62 | Bruce | 307—88.5 |
| 3,054,911 | 9/62 | Buelow | 307—88.5 |

ARTHUR GLUSS, *Primary Examiner.*